W. T. WELCH, Jr.
Wagon-Brake.
No. 7,177. Patented Mar 12, 1850.
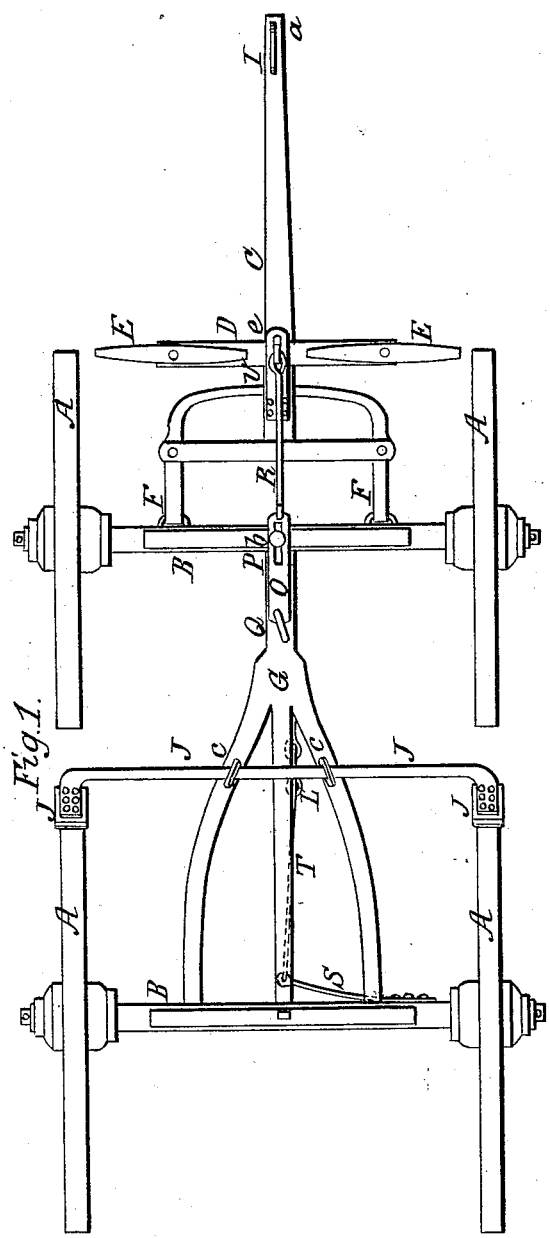
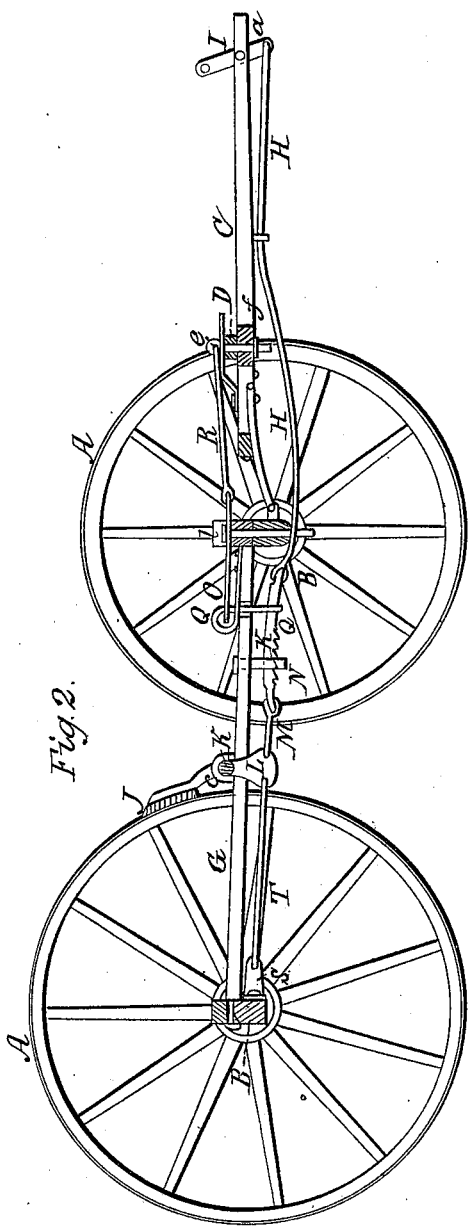

UNITED STATES PATENT OFFICE.

WILLIAM T. WELCH, JR., OF CHURCHVILLE, MARYLAND.

BRAKE FOR CARRIAGES.

Specification of Letters Patent No. 7,177, dated March 12, 1850.

*To all whom it may concern:*

Be it known that I, WILLIAM T. WELCH, Jr., of Churchville, in the county of Harford and State of Maryland, have invented a new and useful Improvement in Retarders for Retarding Wagons in Descending Steep Grades, reference being made to the annexed drawings, making part of this specification.

Figure 1, represents the plan or top view of the running gear of a wagon. Fig. 2, is a longitudinal section through the same, the rubbers being in contact with the peripheries of the rear wheels.

The letters on the two figures refer to the same parts.

A, A, are the wheels; B, B, the axeltrees; C, the tongue; D, the sway bar; E E, the swingle-trees; F F, the futchels or hounds; G, the perch connecting the front and rear axle-trees; H, is the connecting rod secured beneath the tongue; I, is the turning plate or lever secured to the front end of the tongue by a bolt (*a*) on which it turns; and to the connecting rod H; to this plate the breast chains are also attached. J, J, are the rubbers. J is the rubber bar secured to the perch by two staples (*c c*). These parts are constructed and arranged in the usual, or most approved manner.

My improvements relate to the combination and arrangement of a suspended toothed or notched locking bar K with the connecting rod, rubber bar, and plate with its spring hook rod for disengaging said locking bar to relieve the rubbers from the peripheries of the wheels. K is the suspended notched or toothed bar having one of its ends attached to the connecting rod H, and its opposite end to a plate L secured to and projecting from the rubber bar, by means of a rod M. This bar K is for the purpose of holding the rubbers in contact with the peripheries of the wheels, when the connecting rod is drawn forward, by its notches or teeth engaging with a strong iron staple N, projecting from the perch as seen in Fig. 2.

O, is a plate secured or held in its proper place by the bolt (*b*) that passes through the bolster or spring bar of the front axletree, and provided with a slip P, to allow it to move longitudinally. This plate O, is connected at one of its ends by a spring hook rod Q fastened to the perch, and bent or coiled and made to project through an opening therein and under the notched or toothed bar K, the opposite end of the plate O, being connected to a rod R which is attached to the bolt *e* of the sway bar in such a manner as that when the sway bar is made to move forward by the action of the horses, the plate O, will be made to act upon the spring hook rod Q and lift and disengage the locking bar K from the staple N and thus relieve the rubber from the wheels.

S is a spring bar, having one of its ends attached to the rear axletree, and the other to a rod T, which is also connected to the plate L of the rubber bar J' so that when the locking bar K is released from the staple N the spring S will draw said bar K backward by its connection with the rubber bar J and consequently the rubbers will be made to recede from the peripheries of the wheels.

V is a plate attached to the tongue and provided with a slit through which the bolt *e* passes that secures the sway bar D for steadying the sway bar in its movement, there being also a mortise *f* in the tongue to allow said bolt to move with its sway bar back and forth.

The operation of this retarder is the same as others in use. In descending grades, the breast chains of the horses being attached to the turning plate I in the usual manner, the connecting rod H will be made to move forward and with it the locking bar K over the fixed staple N until the rubbers are made to advance against the peripheries of the wheels with sufficient pressure to produc the desired effect when the bar K will lock itself with the staple N and hold the rubbers against the wheels, until the horses are made to advance or draw, in passing over a plain, when the sway bar will be made to move forward and with it the plate O, and so act upon the spring hook rod Q as to lift and disengage the locking bar and thus relieve the rubbers.

The operation of locking the wheels only occurs in descending grades.

Having described my improvements, all that I claim as my invention and desire to secure by Letters Patent, is —

The combination and arrangement of the suspended toothed or notched bar K, staple N, spring hook rod Q, connecting rod H and plate O for actuating and locking the rubbers against the peripheries of the wheels, and unlocking the same in passing over plains, by the action of the horses as described and represented.

In testimony whereof I have hereunto signed my name before two subscribing witnesses.

WILLIAM T. WELCH, Jr.

Witnesses:
   LUND WASHINGTON,
   A. E. H. JOHNSON.